United States Patent [19]

Broome

[11] 4,097,013

[45] Jun. 27, 1978

[54] TRIPOD STAND FOR PROJECTION SCREEN

[75] Inventor: Michael D. Broome, Greenfield, Ind.

[73] Assignee: Draper Shade and Screen Co., Spiceland, Ind.

[21] Appl. No.: 787,169

[22] Filed: Apr. 13, 1977

[51] Int. Cl.$^2$ .................... F16M 11/38; G03B 21/56
[52] U.S. Cl. ........................................ 248/171; 160/24
[58] Field of Search ............... 248/168, 169, 170, 171, 248/408, 409, 410, 125; 160/24, 351

[56] References Cited

U.S. PATENT DOCUMENTS

| | | | |
|---|---|---|---|
| 2,361,119 | 10/1944 | Owens | 160/24 |
| 2,549,584 | 4/1951 | Eller | 248/171 |
| 2,621,802 | 12/1952 | Stover | 248/170 |
| 2,812,020 | 11/1957 | Wachtendorff | 160/24 |
| 2,838,784 | 6/1958 | Cooley et al. | 160/24 |
| 2,864,577 | 12/1958 | DuMais | 248/171 |
| 2,905,420 | 9/1959 | Petrick | 248/171 |
| 3,022,816 | 2/1962 | Petrick et al. | 160/24 |
| 3,868,078 | 2/1975 | Zinn | 248/125 |

Primary Examiner—Marion Parsons, Jr.
Attorney, Agent, or Firm—John N. Randolph

[57] ABSTRACT

A tripod stand, providing a portable support for a projection screen, having a handle which is slidably movable on the standard of the stand and to which the case, which houses the viewing screen and its spring loaded roller, is swivelly connected. The handle is equipped with two latches both of which must be released for movement of the handle on the standard. The index finger of the hand gripping the handle, is positioned to release one of the latches and the other latch is released by the thumb of the same hand, leaving the other hand free for other functions, such as, manipulating the screen case. A bracket to which the legs of the stand are pivotally connected is slidably movable on the standard and cooperates with leg braces which are pivotally connected to the legs and standard for moving the legs between extended and folded positions. Detent members carried by the legs engage under the flared lower end of a collar which is secured around the standard for latching the legs in their folded positions.

2 Claims, 5 Drawing Figures

TRIPOD STAND FOR PROJECTION SCREEN

SUMMARY

It is a primary object of the present invention to provide a tripod stand, for a projection screen, having a novel handle for supporting a screen case in different adjusted positions on the standard, and a unique locking mechanism for the folding legs of the stand.

More particularly, it is an object of the invention to provide a handle having two latches for normally retaining the handle immovably positioned on the standard, both of which must be released simultaneously to effect movement of the handle relative to the standard, one of which can be released by the index finger of the hand grasping the handle, and the other which is released by the thumb of the same hand.

Still another object of the invention is to provide a unique and extremely simple and inexpensive mechanism for effectively locking the stand legs in folded positions, longitudinally of the standard, and wherein the locking and unlocking is accomplished automatically by movement of a bracket member, to which the legs are pivotally connected, longitudinally on the standard.

Various other objects and advantages of the invention will hereinafter become more fully apparent from the following description of the drawings, illustrating a presently preferred embodiment thereof, and wherein:

DESCRIPTION OF THE PREFERRED EMBODIMENT

Referring more specifically to the drawings, the improved tripod stand in its entirety is designated generally 6 and includes a standard 7 formed of telescopic sections, as is conventional, having a conventional support bracket 8 connected to the upper end of its extensible upper section.

Figure 3:
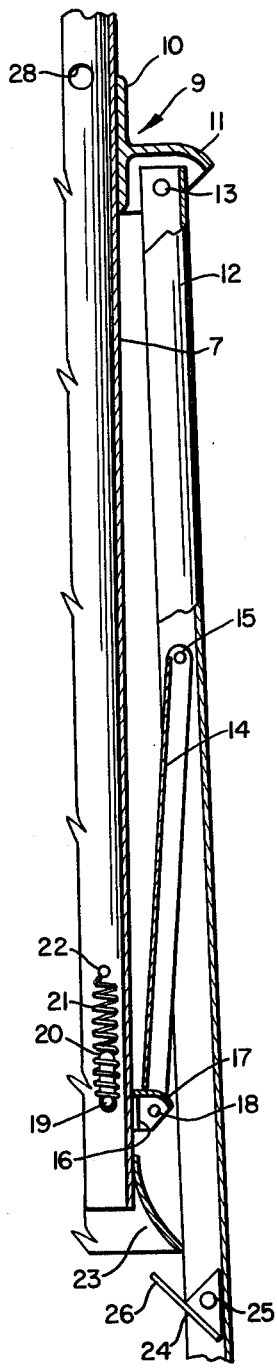
FIG. 3 is an enlarged fragmentary longitudinal sectional view of a portion of the lower part of the standard and one of the supporting legs, with the leg shown in a folded position prior to the latching thereof.
Figure 4:
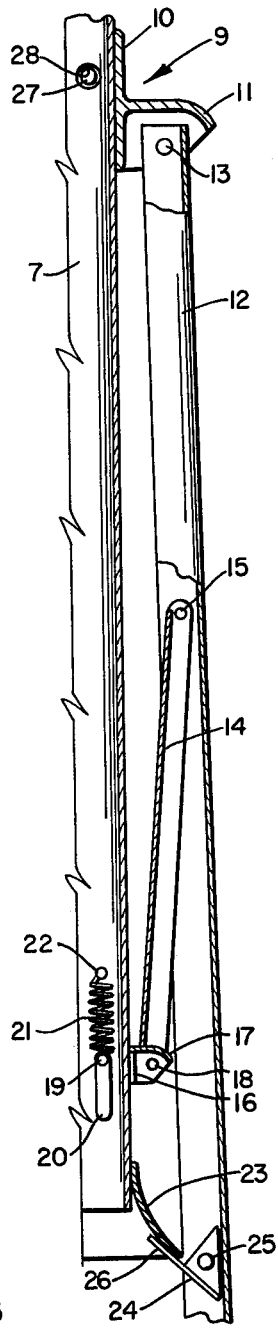
FIG. 4 is a view similar to FIG. 3 but showing the leg in its latched position.

A bracket 9 includes a collar 10 which is slidably mounted on the standard 7 and which has at least three arch-shaped projections 11 extending outwardly from the collar 10 and which are equally spaced circumferentially from one another. The projections 11 open downwardly and outwardly, as seen in FIGS. 3 and 4. The upper end of a leg 12 is disposed in each projection 11 and is pivotally connected thereto by a pin 13 which extends through the projection and leg. The legs 12 are channel-shaped in cross section and open inwardly toward the standard 7. A brace 14 is associated with each leg 12. Each brace 14 has one end extending into the open side of its leg 12 and is pivotally connected thereto by a pivot element 15. A collar 16, FIG. 1, is slidably mounted on the standard 7 below the bracket 9 and has ears 17 projecting outwardly therefrom to which the other ends of the braces 14 are pivotally connected by pins 18.

A pin or rivet 19 extends through longitudinally extending aligned slots 20 in the standard 7 and has its ends anchored in the collar 16. A compression spring 21 is disposed in the standard 7 and has its lower end bearing on the rivet 19 and its upper end engaging against a rivet 22 which extends through the standard 7, for urging the rivet 19 and collar 16 to their lowermost positions of FIGS. 1 and 3. A flared collar or bell-shaped keeper 23 has its restricted upper portion secured around the lower end of the standard 7, below the collar 16, and its flared lower end preferably disposed below the lower end of said standard. A detent 24 is secured by a fastening 25 in the channel of each leg 12, and has a portion 26 projecting inwardly from the leg to engage in the flared open lower portion of the keeper 23, for latching the leg in its folded position of FIG. 4.

Figure 2:
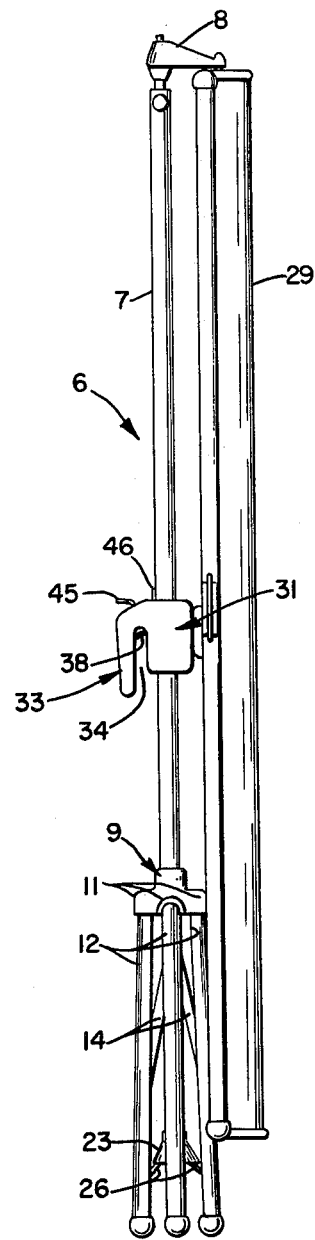
FIG. 2 is an elevational view showing the stand in a folded position for storage or transport.

A spring loaded plunger 27 is carried by the collar 10 to engage in opening 28 of the standard 7 for latching the bracket 9 in its elevated position of FIGS. 2 and 4, with the legs 12 latched in their folded positions and retained by the detent portions 26 engaged in the bell-shaped keeper 23.

Figure 1:
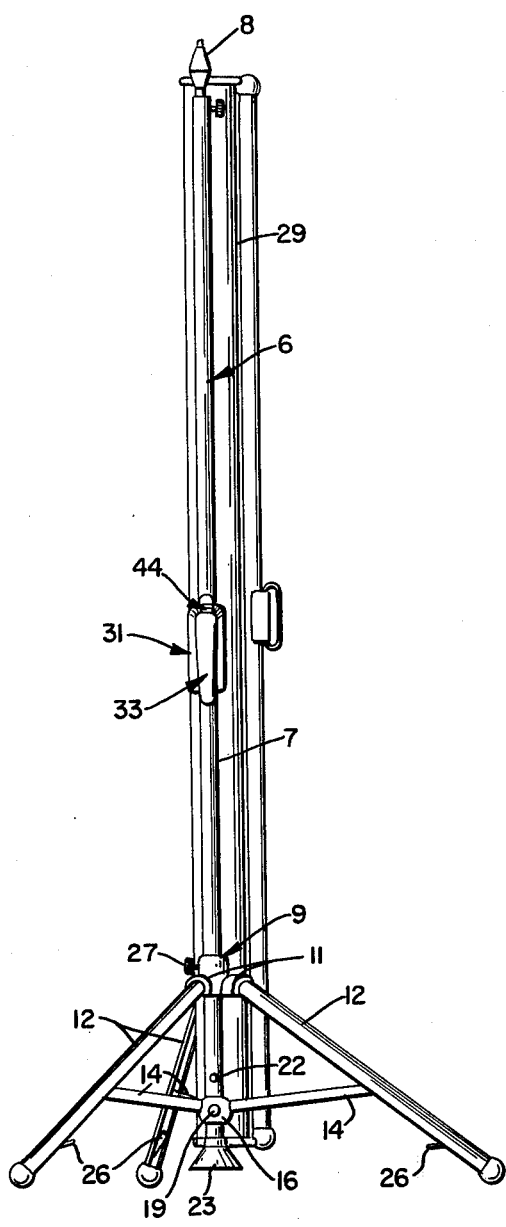
FIG. 1 is an elevational view showing the tripod stand in an open position capable of supporting the projection screen case connected thereto.

When the legs 12 are in their extended positions of FIG. 1, the collar 16 is held in its bottommost position of FIGS. 1 and 3 by the pressure of the spring 21 on the rivet 19 for retaining the legs in extended positions. The legs 12 are swung inwardly from their extended positions of FIG. 1 to their folded but unlocked positions of FIG. 3. During this movement, the collar 16 remains in its bottommost position by the pressure of the spring 21 on the rivet 19 and the bracket 9 moves from its position of FIG. 1 to adjacent its position of FIG. 2. A further upward force is then applied to the bracket 9 to cause said bracket, the legs 12, braces 14 and collar 16 to move upwardly to their positions of FIG. 4, at which time the plunger 27 snaps into the opening 28 for latching the bracket 9 to the standard 7, in the raised position thereof and with the detent portions 26 engaging in the keeper 23 for latching the legs 12 in their folded positions.

A case 29, which contains a viewing screen mounted on a spring loaded roller, is swively connected intermediate of its ends in a conventional manner to a part 30 of a handle 31 which is mounted on the standard 7. The handle 31 has aligned openings 32 at the top and bottom thereof through which the standard 7 extends. Handle 31 has a grip portion 33 and a downwardly opening recess portion 34 to accommodate the fingers of the hand engaging the grip portion 33.

A finger engaging lever 35 has an opening 36 through which the standard 7 extends and which is somewhat larger than said standard to allow the lever to slide freely thereon, with the handle, when said lever is disposed substantially perpendicular to the standard. One end of the lever 35, located adjacent the opening 36, bears on a pin 37 which extends through the handle 31 remote from the grip 33. The other finger engaging end 38 of the lever 35 extends across an upper portion of the recess 34 and is located in a recessed part 39 of the handle. A U-shaped spring 40 is disposed in the recess 39 and has an upper end 41 seating in a socket 42 of the grip 33 and a lower portion 43 bearing on the finger engaging portion 38 for holding the lever 35 at an incline and in gripping engagement with the standard 7 for latching the handle 31 to said standard.

A locking lever 44 has end portions 45 and 46 extending through slots 47 and 48, respectively, in the top portion of the grip 33. Said portions 45 and 46 converge and merge to form a V-shaped portion 49 which rests on an internal part 50 of the handle 31. A pin 51 extends transversely through a part of the handle 31 and through said V-portion 49. A U-shaped spring 52 has a lower leg 53 which rests on a ledge 54 of the handle. An upper leg 55 of the spring 52 bears against the underside of the lever end 45. The intermediate portion of the spring 52 is loosely confined between the handle portion 50 and a pin 58 which is anchored in the handle. The lever end 46 terminates in a projection or pin 59 which faces toward the standard 7 and which is engageable in a keeper or opening 60 of said standard. The other lever end 45 forms a thumb rest.

When the pin 59 is engaging the opening 60, the handle 31 is in its position of FIGS. 1 and 2. In this position, the case 29 may be disposed in an upright position with an upper end of the case engaging the support bracket 8, as is conventional, to prevent rotary movement of the case relative to the handle.

Figure 5:
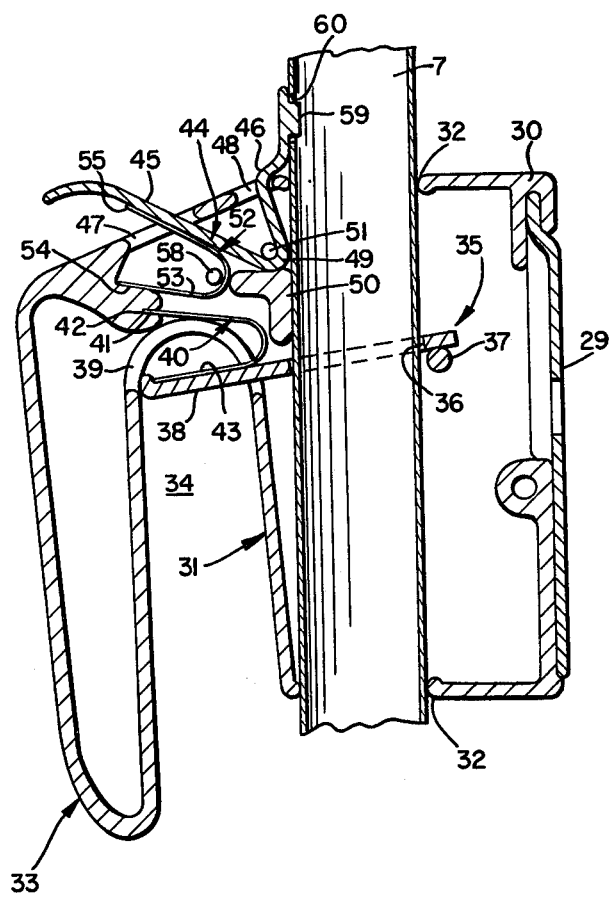
FIG. 5 is an enlarged fragmentary sectional view taken substantially centrally through the handle and a part of the standard.

The handgrip 33 can be grasped with either hand and with the index finger bearing under the lever end 38 and the thumb engaging the thumb rest 45. An upward pressure with the index finger will rock the lever 35 on its fulcrum 37 toward a horizontal position to disengage the lever portion surrounding the opening 36 from its gripping engagement with the standard 7. At the same time, downward pressure with the thumb on the lever portion 45 will swing the lever 44 counterclockwise to disengage the pin 59 from the opening 60 so that the handle 31 can be moved downward, after which the case 29 can be swung to a horizontal position and the viewing screen extended and attached to the support bracket 8, in a conventional manner, with the other free hand. As soon as upward pressure on the lever portion 38 is released by the index finger, the spring 40 will cause the lever 35 to rock back to its position of FIG. 5 with said lever gripping the standard 7 for latching the handle 31 to the standard.

Various modifications and changes are contemplated and may be resorted to, without departing from the function or scope of the invention.

I claim as my invention:

1. A tripod stand for a projection screen comprising a standard having an upper end and a lower end, a set of legs, a bracket slidably mounted on the standard and pivotally connecting upper ends of said legs to the standard adjacent said lower end thereof for swinging movement between extended open and operative positions for supporting the stand and folded positions substantially parallel to one another, means latching the legs in the folded position thereof including an annular keeper secured around the standard and extending below the lower end thereof, detent elements secured to the legs and engaging in an open lower end of the keeper, a collar slidably mounted on the standard below said bracket, leg braces having corresponding ends pivotally connected to said collar and opposite ends pivotally connected to said legs for bracing the legs in their extended positions, spring means supported by the standard and urging said collar downwardly, said spring means permitting upward movement of the collar with said bracket, legs and braces for displacing said detents upwardly and into the keeper, and means for latching said bracket to the standard to retain the legs in folded, latched positions.

2. A tripod stand as in claim 1, said annular keeper being bell-shaped.

* * * * *